United States Patent [19]

Victorius

[11] 4,451,597

[45] May 29, 1984

[54] HIGH SOLIDS COLOR COAT CONTAINING ALCOHOL SOLUBLE CELLULOSE ACETATE BUTYRATE

[75] Inventor: Claus Victorius, Media, Pa.

[73] Assignee: E. I. Du Pont de Nemours and Company, Wilmington, Del.

[21] Appl. No.: 441,745

[22] Filed: Nov. 15, 1982

[51] Int. Cl.³ .................. C08L 1/14; C08B 21/08; B32B 5/16; B32B 27/08
[52] U.S. Cl. ........................................ 524/39; 524/40; 524/437; 524/512; 528/44; 528/48; 427/409; 428/402; 428/418
[58] Field of Search .................. 524/37, 38, 39, 40, 524/437, 512; 528/44, 48; 427/140, 409; 428/63, 402, 418

[56] References Cited

U.S. PATENT DOCUMENTS

| | | | |
|---|---|---|---|
| 3,558,564 | 1/1971 | Vasta | 524/507 |
| 3,622,651 | 12/1972 | Vasta | 524/597 |
| 3,637,546 | 1/1972 | Parker | 428/334 |
| 3,674,734 | 7/1972 | Parker | 428/334 |
| 3,862,062 | 1/1975 | Harper | 524/40 |
| 3,862,063 | 1/1975 | Pettit, Jr. | 524/40 |
| 4,131,571 | 12/1978 | Crawley et al. | 524/40 |
| 4,208,465 | 6/1980 | Chang | 428/416 |
| 4,359,504 | 11/1982 | Troy | 428/403 |

Primary Examiner—John Kight, III
Assistant Examiner—Nathan M. Nutter
Attorney, Agent, or Firm—Hilmar L. Fricke

[57] ABSTRACT

The coating composition useful as the exterior finish on automobiles and trucks contains about 25-50% by weight of a binder of film-forming constituents and 50-75% by weight of a volatile organic solvent carrier and additionally contains 2-150% by weight, based on the weight of the binder, of pigment; the binder is about 20-70% by weight of an acrylic polymer containing reactive hydroxyl, carboxyl, amide groups or any mixture of such groups, about 0-40% by weight of a hydroxy-terminated polyester urethane resin and about 25-40% by weight of an alkylated melamine formaldehyde crosslinking resin; in addition the composition contains about 4-20% by weight, based on the weight of the binder, of a rheology control agent of an alcohol soluble cellulose acetate butyrate having a buryryl content of about 45-50% by weight, a hydroxyl content of about 4-5% by weight and a viscosity of about 0.2-0.4 second.

19 Claims, No Drawings

HIGH SOLIDS COLOR COAT CONTAINING ALCOHOL SOLUBLE CELLULOSE ACETATE BUTYRATE

BACKGROUND OF THE INVENTION

This invention is related to a color coat/clear coat finish of high solids coating compositions, in particular, to mottle and strike-in resistant high solids color coat compositions containing as a rheology control additive an alcohol soluble cellulose acetate butyrate.

Conventional enamel coating compositions of a high molecular weight acrylic polymer and melamine crosslinking resin are well known in the art as shown by Vasta U.S. Pat. No. 3,622,651, issued Nov. 23, 1971; Hick U.S. Pat. No. 3,841,895, issued Oct. 15, 1974; Parker U.S. Pat. No. 3,674,734, issued July 4, 1972; and Parker U.S. Pat. No. 3,637,546, issued Jan. 25, 1972. These patents illustrate high quality coating compositions. However, these compositions have a relatively low solids content to provide for good application properties and good properties of the resulting dried finish. To utilize these compositions in areas which have strict air pollution regulations, pollution abatement equipment is required. This equipment is expensive and increases capital investment of a plant and is costly to operate. Attempts to reduce the solvent content of these conventional compositions generally have been unsuccessful.

Color coat/clear coat finishes have been developed in recent years as a topcoat system for automobiles and other industrial articles which give appearance superior to conventional "unifinish" enamels. Color coat/clear coat enamels are two-layer finishes consisting of a pigmented basecoat overcoated with a transparent clear. The clear is usually applied to the wet basecoat after a short solvent flash period, and the color coat/clear coat coating is then baked to cure both layers simultaneously. The clear coat imparts a smoothness, depth and clarity to the color coat/clear coat enamel which cannot be obtained in a "unifinish" enamel containing pigment throughout its thickness. The superior appearance of color coat/clear coat enamels is especially pronounced in metallic finishes containing aluminum flake, because this relatively large pigment tends to reduce the surface smoothness and gloss of conventional enamels whereas in color coat/clear coat enamels the metallic basecoat is overcoated with a smooth clear.

Formulation of acceptable color coat/clear coat coatings requires the solution of two problems peculiar to these finishes. A problem in metallic basecoats is the pronounced tendency of the aluminum flakes, at the high concentrations needed for hiding at the 0.5-1 mil dry film thickness used, to assume different orientations in the cured basecoat film depending on film thickness and application conditions, resulting in large scale mottling, a blotchy appearance, and an unacceptable variation of brightness and color with color coat film thickness. A problem in both metallic and solid color coat/clear coat finishes is the tendency of solvents from the clear coat applied over the wet basecoat to diffuse into the basecoat and remobilize the pigments in it, resulting in mottling of metallic basecoats and color change in both metallic and solid color basecoats. This phenomenon is referred to as "strike-in" of the clear.

These problems have been overcome in low solids acrylic/melamine and polyester/melamine color coats by incorporating a high molecular weight cellulose acetate butyrate, of a type conventionally used in finishes for metallic flake control, into the basecoat binder, as exemplified in an article by K. Walker titled "Wet-On-Wet Coatings" in Polymers Paint and Colour Journal, Oct. 17, 1979. However, because of the high molecular weight of the cellulose acetate butyrate employed, these basecoats must be spray-applied at very low solids contents in the range of 12-15 weight percent.

In an effort to obtain high solids color coat/clear coat coating compositions that meet current or anticipated air pollution regulations and can be applied by conventional spraying techniques, the molecular weight of the acrylic polymer used in these compositions was reduced substantially, resulting in a reduction in the basecoat solvent content. These higher solids color coat/clear coat enamels had much poorer mottle resistance and color uniformity, which could not be corrected by addition of the aforementioned high molecular weight cellulose acetate butyrate resins to the basecoat without reducing its spray solids content to unacceptably low levels.

There is a need for high solids color coating compositions that provide a low viscosity under typical spraying conditions when the coating compositions are applied and provide a substantially increased viscosity after appliction to prevent mottling and color variations. High solids color coat compositions containing rheology control additives of this invention have such properties and have an overall appearance acceptable for exterior finishes of automobiles and trucks and other industrial articles.

SUMMARY OF THE INVENTION

An acrylic color coat enamel coating composition has now been developed having about 25-50% by weight of a binder of film-forming constituents and 50-75% by weight of a volatile organic solvent carrier at spray viscosity and containing in addition about 2-150% by weight, based on the weight of the binder, of pigment; the binder having about 20-70% by weight, based on the weight of the binder, of an acrylic polymer containing reactive hydroxyl groups, carboxyl groups, amide groups, or any mixture of such groups, about 0-40% by weight, based on the weight of the binder, of a hydroxy-terminated polyester urethane resin, about 25-40% by weight, based on the weight of the binder, of an alkylated melamine formaldehyde crosslinking agent and about 4-20% by weight, based on the weight of the binder, of a rheology control agent which consists essentially of an alcohol soluble cellulose acetate butyrate having a butyryl content of about 45-50% by weight, a hydroxyl content of about 4-5% by weight and a viscosity of about 0.2-0.4 second.

DESCRIPTION OF THE INVENTION

It has now been found that alcohol soluble cellulose acetate butyrate is an effective rheology control agent in high solids color coat/clear coat coatings. When added to the base color coat, the rheology control agent of this invention permits coatings of uniform color to be applied over a broader range of film thicknesses and application conditions (greater application latitude) and gives freedom from resolubilization of the color coat by the clear coat (strike-in) causing pigments to become mobile again and change the color of the coating. The rheology control agent of this invention is especially effective as aluminum flake control agent in metallic color coats where, in addition to the above-mentioned advantages, it prevents color nonuniformities known as mottling and gives high metallic brightness.

The high solids color coat coating composition of this invention has a binder content of film-forming constituents of about 25–50% by weight. Preferably, the composition has a binder content of about 28–45%. The composition contains about 50–75% by weight of a volatile organic solvent carrier which generally is a solvent for the binder. The binder contains 4–20% by weight of a rheology control agent. The composition contains about 2–150% by weight of pigment based on the weight of the binder.

The rheology or flake control agent is an alcohol soluble butyrate, a grade of cellulose acetate butyrate (Eastman CAB-533-0.4), hereinafter referred to as ASB. ASB has a butyryl content of about 45–50% by weight, a hydroxyl content of about 4–5% by weight and viscosity of about 0.2–0.4 second measured according to ASTM Method D-1343 in the solution described as Formula A, ASTM Method D-817. In order to maximize the solids content and minimize the solvent content of the color coat enamels, it is preferred to use ASB having a viscosity of about 0.2–0.3 second. Because of its high hydroxyl content, ASB crosslinks with the melamine resin when the coating is baked, forming an integral part of the binder.

The solubility properties of ASB are markedly different from those of normal finishes grades of cellulose acetate butyrate. ASB forms low viscosity solutions in low molecular weight alcohols, ketones and glycol ethers, and in blends of aromatic hydrocarbons with minor amounts of ethanol but yields extremely high viscosity solutions in slow solvents such as methyl n-amyl ketone, a principal slow solvent in basecoat enamel. Its solubility properties differ markedly from those of normal finishes grades of cellulose acetate butyrate, such as Eastman's CAB-381-0.5 and CAB-531-1, as shown by the following comparison of solution viscosities:

| Solvent | ASB Solution | | Viscosity of 15% CAB-381-0.5 Solution, Cps. | Viscosity of 15% CAB-531-1 Solution, Cps. |
| --- | --- | --- | --- | --- |
| | ASB Conc'n. | Viscosity Centipoises | | |
| Methanol | 15% | 52 | Insoluble | Insoluble |
| Ethanol | 15% | 205 | Insoluble | Insoluble |
| Methyl ethyl ketone | 15% | 138 | 80 | 170 |
| Ethylene glycol monoethyl ether | 15% | 235 | 700 | 950 |
| n-Butyl acetate | 10% | >100,000 | 272 | 585 |
| Methyl n-amyl ketone | 10% | >100,000 | 267 | 577 |
| Toluene | — | Insoluble | Gel | Insoluble |
| Toluene/95% ethanol (80/20 blend) | 15% | 130 | 90 | 150 |

It is desirable to formulate color coat enamels in a blend of volatile, strong solvents for ASB with slower evaporating, poor solvents for ASB to obtain low viscosity and high spray solids and rapid set-up after application. When fast strong ASB solvents evaporate rapidly on application of the color coat, ASB forms a viscous solution in slow poor solvents and "gels" the color coat. This allows the color coat to remain fluid a few seconds after application to obtain flow-out but then sets up the color coat rapidly to prevent further differential movement of aluminum flakes in metallic colors.

If no slower evaporating, strong ASB solvents are present in the clear coat, ASB in the color coat prevents strike-in of solvents from the clear coat into the wet basecoat which can result in remobilization of aluminum flake and other pigments. ASB is conveniently introduced as a 30% solution in 1:1 by weight ethanol/methyl n-amyl ketone or 1:1 by weight ethanol/methyl ethyl ketone.

The advantages of high solids color coat coating compositions that contain the rheology control additive are as follows: the composition can be sprayed on vertical surfaces without sagging and running on the substrate to which it was applied; the resulting finish has excellent gloss and image definition (smoothness); when metallic flakes are used in the composition, the flakes are more properly oriented and more uniformly dispersed in the finish with an improved brightness and with less or no evidence of mottling caused by differential orientation of the metallic flakes.

The principal binder of the composition is an acrylic polymer having carboxyl, hydroxyl or amide groups a weight average molecular weight of about 2500–25,000 and a glass transition temperature of about $-20°$ C. to $+25°$ C.

Typically useful acrylic polymers contain alkyl methacrylate, alkyl acrylate, hydroxyalkyl acrylate, hydroxyalkyl methacrylate and can contain styrene, acrylic acid or methacrylic acid. Amide monomers such as methacrylamide and acrylamide can be used; glycidyl monomers such as glycidyl acrylate or glycidyl methacrylate can also be used.

Preferred acrylic polymers are of an alkyl methacrylate that has 1–18 carbon atoms in the alkyl group, an alkyl acrylates that has 1–18 carbon atoms in the alkyl group and a hydroxyalkyl acrylate or a hydroxyalkyl methacrylate each having 2–4 carbon atoms in the hydroxyalkyl group. To form an acrylic polymer which has a hydroxyl content of about 2–6% by weight, a sufficient amount of the aforementioned hydroxyalkyl acrylate or methacrylate is utilized. The polymer also can contain small amounts of ethylenically unsaturated carboxylic acid, such as acrylic acid, methacrylic acid, itaconic acid, in amounts of about 0.1–5% by weight.

Typical alkyl methacrylates and acrylates that can be used to prepare the acrylic polymers are: methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, isobornyl methacrylate, methyl acrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, phenyl acrylate, isobornyl acrylate, and the like.

Adhesion promoting monomers can also be used in the acrylic polymers such as diethyl aminoethyl methacrylate, tertiary butyl aminoethyl methacrylate, 3-(2-methacryloxy ethyl)-2,2-spiro cyclohexyl oxazolidene and the like.

Typical hydroxyalkyl acrylates and methacrylates which can be used to prepare the acrylic polymers are: 2-hydroxyethyl acrylate, hydroxypropyl acrylate, 4-hydroxybutyl acrylate, 2-hydroxyethyl methacrylate, hydroxypropyl methacrylate, 4-hydroxybutyl methacrylate, and the like.

The acrylic polymers can contain about 0.1–30% by weight of other constituents such as acrylonitrile, methacrylonitrile, acrylamide and methacrylamide, styrene or substituted styrene such as methyl stryene.

The acrylic polymers utilized in the coating composition are prepared by solution polymerization in which the monomers are blended with solvent, polymerization initiator and, optionally, a chain transfer agent, and heated to about 75°–150° C. for 1–6 hours to form a polymer that preferably has a weight average molecular weight of about 2500–25,000, a hydroxyl content of 2–6% by weight and a glass transition temperature of about −20° C. to +25° C.

The weight average molecular weight of the acrylic polymers is determined by gel permeation chromatography using polymethylmethacrylate or polystyrene as a standard.

The glass transition temperature of the polymers is determined by differential scanning calorimetry or is calculated.

One technique that is successfully used in preparing the acrylic polymers is a programmed addition of monomers, solvents, initiator solution and optionally a chain transfer agent into a polymerization vessel at a given rate. Optionally, the polymers can be terminated with the chain transfer agent at the desired low molecular weight. Also, if required, after the polymerization is completed, solvents can be stripped off to increase the polymer solids content of the resulting polymer solution.

Typical solvents which are used to prepare the acrylic polymer are the following: toluene, n-butyl acetate, methyl ethyl ketone, methyl n-amyl ketone, n-butyl alcohol, ethylene glycol monoethyl ether acetate, and other aliphatic, cycloaliphatic and aromatic hydrocarbons, esters, ethers, ketones and alcohols.

About 0.1–4% by weight, based on the weight of the monomers, of the polymerization initiator is used to prepare the acrylic polymer. Typical initiators are: azobisisobutyronitrile, azobis(gamma-dimethyl valeronitrile), benzoyl peroxide, t-butyl peracetate, di-t-butyl peroxide and the like.

A chain transfer agent can be used to control the molecular weight of the acrylic polymer. Typical chain transfer agents are 2-mercaptoethanol, dodecyl mercaptan, benzene thioethanol, mercaptosuccinic acid, butyl mercaptan, mercaptopropionic acid and the like. When a transfer agent is used, the resulting acrylic polymer contains about 0.1–10% by weight of the chain transfer agent.

Useful acrylic polymers for the preferred composition contain 50–90% by weight of an alkyl methacrylate or an alkyl acrylate each having 1–12 carbon atoms in the alkyl groups or a mixture thereof, and 10–50% by weight of a hydroxyalkyl acrylate or a hydroxyalkyl methacrylate each having 2–4 carbon atoms in the alkyl group or a mixture thereof. These polymers can contain up to 30% by weight of styrene which replaces a portion of the alkyl methacrylate or alkyl acrylate. Also these polymers can contain up to 5% by weight of an ethylenically unsaturated carboxylic acid.

An alkylated melamine formaldehyde crosslinking agent is used in the composition. The alkylated melamine formaldehyde resin used generally has 1–4 carbon atoms in the alkyl group. The resin is prepared by conventional techniques in which an alcohol such as methanol, ethanol, propanol, isopropanol, butanol, isobutanol and the like is reacted with a melamine formaldehyde resin. The resin can be fully alkylated and substantially monomeric or partially alkylated and polymeric. One preferred resin which gives a high quality finish is a fully alkylated methoxy/butoxymethyl melamine (Monsanto Resimene ® 755). Another useful resin is a low temperature cure, high solids, partially methylated, polymeric melamine formaldehyde resin (Monsanto Resimene ® 717). When a fully alkylated melamine is used, the composition contains about 0.1–2.0% by weight, based on the weight of the binder, of a strong acid catalyst. When a polymeric melamine is used, the main film-forming polymer contains about 2–5% of a carboxylic acid to catalyze the curing reaction.

The composition may contain hydroxy-terminated polyester urethanes to improve flow-out of the color coat and, consequently, smoothness of the clear applied over it. These polyurethanes can be incorporated for the additional purpose of increasing the flexibility of the color coat so that it can be applied to flexible substrates such as fascia materials under a flexible clear and will withstand bending of the coated fascia material at low temperatures without cracking. The composition may contain up to 40% by weight, based on the total binder, of polyurethane which replaces a portion of the acrylic resin. One polyurethane used in these compositions is prepared by reacting 75 parts by weight of polycaprolactonediol having a number average molecular weight of 830 and 2 parts by weight of 2,2-bis(hydroxymethyl) propionic acid with 30 parts by weight of methylenebis(cyclohexylisocyanate) in xylene/ethyl acetate solution and has a number average molecular weight of about 7,000 as determined by gel permeation chromatography using polymethyl methacrylate as standard.

Also, in addition to the above consitutents, plasticizers in the amounts of 0.1–10% by weight, based on the weight of the binder, can be used in the composition. Plasticizers that can be used are, for example, butyl benzyl phthalate, dibutyl phthalate, triphenyl phosphate, 2-ethylhexyl benzyl phthalate, dicylcohexyl phthalate, diallyl phthalate, dibenzyl phthalate, fatty acid esters of pentaerythritol, poly-(propylene adipate) dibenzoate, diethylene glycol dibenzoate, tetrabutylthiodisuccinate, butylphthalylbutyl glycolate, acetyltributyl citrate, dibenzyl sebacate, tricresyl phosphate, toluene N-ethyl sulfonamide, and di-2-ethylhexyl phthalate.

An acid catalyst solution can be added to the composition to increase the rate of crosslinking of the composition on curing. Generally, about 0.1–2% by weight, based on the weight of the binder, of acid catalyst is used. For example, phosphoric acid or an alkyl acid phosphate in which the alkyl group has 1-12 carbon atoms can be utilized for this purpose. Typical alkyl acid phosphates are methyl acid phosphate, ethyl acid phosphate, octyl acid phosphate, phenyl acid phosphate, and the like. An alkyl sulfonic acid or an aryl sulfonic acid can be used such a methane sulfonic acid, para-toluene sulfonic acid or dodecylbenzene sulfonic acid.

To prevent viscosity increase and gelation "in the can" of the compositions containing a strong acid catalyst, the acid catalyst must be fully neutralized with an amine which will volatilize or decompose at the baking temperature of the coating. Examples of such amines are n-propylamine and alkyl oxazolidines. A preferred neutralizing amine is 4,4-dimethyloxazolidine.

The color coat composition contains pigments in a pigment-to-binder ratio of about 2/100 to 150/100. These pigments can be introduced into the composition by first forming a mill base with the acrylic polymer utilized in the composition or with other compatible polymers or polymeric dispersants by conventional techniques, such as sand grinding, ball milling, attritor grinding, two roll milling to disperse the pigments. The mill base is blended with the film-forming constituents as shown in the following Examples.

Any of the conventional pigments used in coating compositions can be utilized in this composition such as the following: metallic oxides, such as titanium dioxide, zinc oxide, iron oxide and the like, metal hydroxides, metal flakes such as aluminum flake, chromates, such as lead chromate, sulfides, sulfates, carbonates, carbon black, silica, talc, china clay, phthalocyanine blues and greens, organo reds, organo maroons and other organic dyes, organic pigments and lakes.

The volatile organic solvent carrier in which the high solids color coat enamel composition of the invention is dissolved should contain at least one fast evaporating, strong solvent for ASB such as methanol, ethanol, acetone and methyl ethyl ketone in order to maximize the spray solids at spray viscosity. A combination of methanol with one or both of ethanol and methyl ethyl ketone ranging from about 30% to about 60% by weight of the total solvents present in the enamel at spray viscosity is generally used. The color coat enamel should also contain at least one slower evaporating poor solvent or solvent mixture for ASB in order to allow the ASB to set up the color coat as soon as the volatile, strong ASB solvents have evaporated. Examples of such poor solvents are methyl n-amyl ketone, n-butyl acetate, ethylene glycol monobutyl ether acetate, and an approximately equivolume blend of ethylene glycol monoethyl ether acetate with diisobutyl ketone. The color coat enamel may also contain minor amounts, up to 20% of total solvents, of a medium evaporating, good ASB solvent to promote flow-out of the color coat and smoothness of the color coat/clear coat finish. Examples of such solvents are ethylene glycol monomethyl ether and propolyene glycol monomethyl ether. The color coat enamel should contain a minimum of and preferably no slow evaporating, good solvents for ASB which would prevent the ASB from setting up the color coat by forming a relatively low viscosity solution of it. Examples of such undesirable solvents are diacetone alcohol, ethylene glycol monobutyl ether and diethylene glycol monoethyl ether. Minor amounts of non-solvents for ASB, such as aromatic and aliphatic hydrocarbons, may be incorporated in the color coat enamel without interfering with the desired rheological effect of the ASB.

Any suitable clear coat composition can be applied over the color coat enamel of this invention provided it contains no substantial amount of slower evaporating, strong ASB solvents which can strike into the color coat and provided it adheres firmly to the color coat layer after cure. To obtain good outdoor durability, clear coat enamels based on acrylic/melamine binders are preferred for use over rigid substrates like steel and rigid plastics. Over flexible substrates like RIM, the clear binder may comprise a hydroxy-terminated polyester urethane resin in combination with a hydroxyfunctional acrylic or polyster resin and a melamine crosslinker.

Optionally, the color coat can contain about 0.1-10% by weight, based on the weight of the binder of the color coat, of an ultraviolet light absorber. Another option is that the color coat and the clear coat each can contain about 0.1-10% by weight, based on the weight of the binder of the coat, of an ultraviolet light absorber. Also, the color coat or the clear coat can contain about 0.1-5% by weight, based on the weight of the binder, of a hindered amine light stabilizer. When a hindered amine light stabilizer is used, the ratio of ultraviolet light absorber to hindered amine light stabilizer is about 1:1 to about 5:1.

Preferred, to form a durable finish, the color coat contains about 1-2% by weight of an ultraviolet light absorber and about 1% of a hindered amine light stabilizer and the clear coat contains about 2-5% of an ultraviolet light absorber and about 1% of a hindered amine light stabilizer.

The coating compositions of this invention can be applied over a variety of substrates, such as metal, wood, glass, plastics, and the like, by any suitable spray application method, such as conventional spraying, electrostatic spraying, or spraying from electrostatic high speed rotary atomizers, e.g., turbobells, and the like. The viscosity of the compositions can be adjusted for any of these methods by adding solvents if necessary. Generally, the composition is utilized at a high solids content which keeps air pollution at a minimum.

The clear coat is usually applied to the wet color coat after a solvent flash period of 1-5 minutes, but the color coat may be dried or cured partially or completely by baking before applying the clear. One technique that is used to insure that there will be no popping or cratering of the coating is to allow the solvents to flash off for about 1-5 minutes before a second coating is sprayed on or otherwise applied, then waiting for about 2-10 minutes before baking the coating to allow additional solvents to flash off.

The color coat/clear coat coatings are baked at relatively low temperatures of about 70°-150° C. for about 15 minutes to 2 hours. The resulting coating is about 1-5 mils thick but for most uses a 2-3 mil thick coating is used. Generally, the color coat is about 0.4-1.6 mils thick and preferably 0.6-1.4 mils thick, and the clear coat is about 0.6-4.0 mils thick and preferably 1.5-2.0 mils thick.

The resulting coating has good gloss, appearance and adhesion to substrates of all types. These characteristics make the composition particularly useful as a finish for automobiles, trucks and other outdoor equipment.

The following examples illustrate the invention. All parts, percentages and ratios are on a weight basis unless otherwise indicated. Molecular weights are determined by gel permeation chromatography.

EXAMPLE 1

An acrylic polymer solution was prepared as follows. A 5 liter round bottom flask equipped with a thermometer, stirrer, reflux condenser, two addition funnels, and a heating mantle was charged with 960 grams of methyl n-amyl ketone. The following premixed solutions were charged to the addition funnels:

|  | Grams |
|---|---|
| Monomer Mixture | |
| Methyl methacrylate | 600 |
| Butyl acrylate | 800 |
| 2-Hydroxyethyl acrylate | 600 |
| Total | 2000 |
| Initiator Solution | |
| Methyl n-amyl ketone | 120 |
| t-Butyl peracetate (75% solids in mineral spirits) | 80 |
| Total | 200 |

The flask charge was heated to reflux. Addition of the monomer mixture and initiator solution was then started simultaneously. The monomer mixture was added linearly over 240 minutes and the initiator solution was added linearly over 260 minutes. The reaction mixture was maintained at reflux during the addition period and for an additional 30 minutes after addition of the initiator solution was complete. The resulting polymer solution was cooled. It had a solids content of 64.0%.

The polymer was a methyl methacrylate/butyl acrylate/2-hydroxyethyl acrylate copolymer in a weight ratio of 30/40/30. The polymer had a weight average molecular weight ($\overline{M}w$) of 5300 and had a calculated glass transition temperature (Tg) of −9° C.

The following aluminum flake mill base was prepared:

|  | Grams |
|---|---|
| Non-leafing, acid spot resistant, medium particle size aluminum flake paste (64% solids in mineral spirits) | 293.0 |
| Methyl n-amyl ketone | 105.5 |
| Acrylic polymer solution (prepared above) | 351.5 |

The above ingredients were vigorously stirred together for 2 hours to form a homogenous dispersion of the aluminum flakes. The mill base contained 25% of pigment and 30% of acrylic polymer.

The following light blue metallic color coat enamels were prepared:

| Ingredients | Color Coat A Containing ASB (Grams) | Color Coat B Without ASB (Grams) |
|---|---|---|
| Portion 1 | | |
| Acrylic polymer solution (prepared above) | 196.3 | 154.7 |
| Polyurethane solution consisting of 62.5% of hydroxy-terminated polyester urethane (condensation product of 75.16 parts of poly- caprolactonediol of number average molecular weight of 830, 1.94 parts of 2,2-bis(hydroxymethyl)propionic acid and 22.90 parts of methylene- bis(cyclohexylisocyanate) having a number average molecular weight of about 7,000), 24.2% of xylene and 13.3% of ethyl acetate | 144.0 | 76.8 |
| Indanthrone blue mill base consisting of 12.0% of indanthrone blue pigment, 48.0% of a styrene/methyl methacrylate/butyl acrylate/2-hydroxyethyl acrylate (15/15/40/30 weight ratio) copolymer having a Mw of about 6,000, and 40.0% of methyl n-amyl ketone and prepared by grinding in a Schold mill | 60.5 | 32.2 |
| Phthalocyanine blue mill base consisting of 18.2% of copper phthalocyanine blue pigment, 21.5% of the copolymer present in the above mill base, 2.8% of an A-B dispersant (methyl methacrylate/butyl methacrylate 50/50 weight ratio copolymer terminated with 2-mercaptoethanol and reacted with the biuret of hexamethylenediisocyanate and capped with ammonia), 55.3% of methyl n-amyl ketone and 2.2% of toluene and prepared by grinding in a steel mill with diagonal steel media | 8.6 | 4.6 |
| Black mill base consisting of 11.7% of high color furnace type carbon black pigment, 11.7% of the copolymer present in the above mill base, 11.7% of the A-B dispersant present in the above mill base, 55.4% of methyl n-amyl ketone and 9.5% of toluene and prepared by grinding in a steel mill with diagonal steel media | 2.0 | 1.1 |
| Ultraviolet light absorber solution of a substituted benzotriazole (Tinuvin ® 328) in xylene (30% solids) | 20.0 | 10.7 |
| Hindered amine light stabilizer (Tinuvin ® 079) solution in xylene (40% solids) | 15.0 | 8.0 |
| Portion 2 | | |
| Aluminum flake mill base (prepared above) | 275.8 | 147.1 |
| Portion 3 | | |
| Methoxy/butoxymethyl melamine (Resimene ® 755) | 210.0 | 112.0 |
| ASB solution consisting of 30% of alcohol soluble cellulose acetate butyrate (Eastman CAB-553-0.4) having a viscosity of 0.25 second, 35% of toluene-denatured anhydrous ethyl alcohol, and 35% of methyl n-amyl ketone | 200.0 | — |
| Toluene denatured anhydrous ethyl alcohol | 70.2 | 64.3 |
| Portion 4 | | |
| Catalyst solution consisting of 28.57% of Cycat ® 600 dodecylbenzenesulfonic acid solution in isopropanol (70% solids), 12.76% of Amine CS-1135 ® 4,4-dimethyloxazolidine solution in water (78% active), and 58.67% of methanol | 24.0 | 12.8 |
| Methanol | 44.1 | 23.5 |
| Portion 5 | | |
| Thinner consisting of 25% of toluene-denatured anhydrous ethyl alcohol, 25% of butyl acetate, 25% of propy- | 520.0 | 99.3 |

-continued

| Ingredients | Grams | |
|---|---|---|
| | Color Coat A Containing ASB | Color Coat B Without ASB |
| lene glycol monomethyl ether and 25% of methyl n-amyl ketone | | |

Portion 1 was charged to a mixing vessel and thoroughly blended. Portion 2 was added and stirred in for 30 minutes. Portions 3 and 4 were then added in turn and each stirred in for 30 minutes. Finally, the color coat enamels were reduced to a spray viscosity of 22 seconds in a No. 2 Fisher viscosity cup with Portion 5 and filtered through a fine paint strainer.

Following are compositional data on the resulting color coat enamels:

| | Color Coat A | Color Coat B |
|---|---|---|
| Acrylic polymer/polyurethane/melamine formaldehyde resin/ASB/dodecylbenzene sulfonic acid/ultraviolet light absorber/hindered amine light stabizer binder ratio | 38.9/14.6/34.0/9.7/0.8/1.0/1.0 | 48.6/14.6/34.0/0/0.8/1.0/1.0 |
| Pigment/binder ratio | 12.6/100 | 12.6/100 |
| Calculated solids content | 38.8% | 49.6% |

The following high solids clear coat enamel was prepared:

| | Grams |
|---|---|
| Portion 1 | |
| Acrylic polymer solution of a styrene/methyl methacrylate/butyl acrylate/2-hydroxyethyl acrylate (15/36/32/17 weight ratio) copolymer having a Mw of 15,000 (65.1% solid in methyl n-amyl ketone) | 1997.0 |
| Methoxy/butoxymethyl melamine (Resimene ® 755) | 588.8 |
| Ultraviolet light absorber solution of a substituted benzotriazole (Tinuvin ® 328) in xylene (30% solids) | 200.0 |
| Hindered amine light stabilizer (Tinuvin ® 079) solution in xylene (40% solids) | 50.0 |
| Silicone solution of an organofunctional silicone (Baysilone ® Fluid OL) in xylene (10% solids) | 1.7 |
| Portion 2 | |
| Silica mill base consisting of 8.93% of a hydrophobic fumed silica (Aerosil ® R-972), 49.60% of methoxy/butoxymethyl melamine (Resimene ® 755) and 41.47% of xylene and prepared by sand grinding | 224.0 |
| Portion 3 | |
| Catalyst solution (described under Portion 4 of above color coat compositions) | 80.0 |
| Methanol | 84.8 |
| Portion 4 | |
| Silica bridging agent solution of polyvinyl pyrrolidone of weight average molecular weight of about 40,000 (PVP-K-30) in methanol (10% solids) | 5.0 |
| Portion 5 | |
| Aromatic hydrocarbon solvent boiling at 150–190° C.(Aromatic 100) | 782.3 |

Portion 1 was charged to a mixing vessel and thoroughly blended. Portions 2 and 3 were added in turn and stirred in for 10 minutes each. Portion 4 was added and stirred in for 30 minutes. Finally, the clear coat enamel was reduced to a spray viscosity of 45 seconds in a No. 2 Fisher cup with Portion 5 and filtered through a milk filter.

The resulting clear coat enamel has an acrylic polymer/melamine formaldehyde resin/dodecylbenzene sulfonic acid/ultraviolet light absorber/hindered amine light stabilizer binder ratio of 62.0/33.3/0.8/2.9/1.0, a silica/binder ratio of 1.0/100 and a calculated solids content of 52.7%.

Each of the color coat enamels in combination with the clear coat enamel was sprayed onto 20 gauge phosphatized steel panels primed first with an electrodeposition primer and then with a high solids polyester/melamine type primer-surfacer. The color coat enamel and the clear coat enamel were applied from separate De Vilbiss Model JGA-502 pressure feed spray guns each equipped with an FX fluid tip having an orifice of 0.0425 inch and with a No. 797 air cap. The color coat and clear coat enamels were delivered to the spray guns from separate pressure tanks at controlled flow rates. The atomizing air pressure was 70 psi at the base of the color coat gun and 60 psi at the base of the clear coat gun.

The color coat/clear coat coating compositions were applied by means of a Spraymation ® automatic panel spray machine. The color coat and clear coat spray guns were mounted side-by-side on a reciprocation arm travelling horizontally at a speed of about 764 inches/minute. The panels were mounted vertically at a distance of 13 inches from the tips of the spray guns on a panel rack which moved vertically from a low to a high position in six 4-inch increments between passes of the spray gun across the panels to "index" the panels during the application of each coat of paint. The color coat enamel was applied in two coats with a 1 minute solvent flash period between coats. The panels were then dried on the rack for 2 minutes and the clear coat was applied in two coats with a 1 minute solvent flash period between coats. The panels were then dried in a horizontal position for about 8 minutes, prebaked 15 minutes at 82° C. and baked 30 minutes at 131° C.

The properties of the two color coat/clear coat finishes are compared below. The "distinctness of image" was determined by means of a Hunter Lab Dori-Gon Meter D47-6 and is a measure of film smoothness, with higher values representing smoother films having a more mirror-like reflectance. The "head-on brightness" and "metallic index" (also called "flake orientation index") were measured with a special goniophotometer called Object-Modulated Reflectometer ® (OMR) and described in Troy U.S. Pat. No. 4,359,504 issued Nov. 16, 1982. The head-on brightness was the lightness calculated from the reflectance measured at an angle of 5° from the normal and was a measure of the metallic lightness of the coating when viewed head-on. The metallic index was explained in U.S. Pat. No. 4,359,504 and was a measure of the metallic glamour or degree of two-tone of the coating. For a given color coat pigmentation higher values of both of these metallic appearance properties result from better flake orientation and represent a more desirable appearance than lower values.

| Properties | Color Coat A/ Clear Coat Finish | Color Coat B/ Clear Coat Finish |
|---|---|---|
| Thickness, mils: | | |
| Color coat | 0.77 | 0.74 |
| Clear coat | 1.8 | 1.8 |
| Gloss measured at 20° | 93 | 76 |
| Distinctness of image | 82 | 42 |
| Head-on brightness | 110 | 69 |
| Metallic index | 60 | 32 |
| Mottling | Slight | Definite |
| Tukon hardness, Knoop | 7.9 | 6.4 |

The color coat/clear coat finish prepared from color coat A containing ASB had greatly superior gloss, distinctness of image, head-on brightness, metallic index and freedom from mottling than the comparable finish prepared from color coat B containing no ASB.

Additional coatings were sprayed from the color coat A enamel with the clear coat enamel under the conditions described above at different color coat and clear coat film thicknesses and had the following properties:

| Property | Thin Coating | Intermediate Coating | Thick Coating |
|---|---|---|---|
| Thickness, mils: | | | |
| Color coat | 0.53 | 0.71 | 1.04 |
| Clear coat | 1.7 | 1.8 | 2.2 |
| Gloss measured at 20° | 93 | 95 | 94 |
| Distinctness of image | 81 | 84 | 84 |
| Head-on brightness | 111 | 112 | 113 |
| Metallic index | 60 | 61 | 61 |
| Mottling | None | None | None |

The above coatings prepared from color coat A had consistent and excellent appearance properties over a wide range of color coat film thicknesses at least as great as that encountered in commercial application of this type of finish.

EXAMPLE 2

An acrylic polymer solution was prepared as follows. A 12 liter round bottom flask equipped with a thermometer, stirrer, distillation head with reflux condenser, two addition funnels, and a heating mantle was charged with 3093 grams of methyl n-amyl ketone. The following premixed solutions were charged to the addition funnels:

| | Grams |
|---|---|
| Monomer Mixture | |
| Styrene | 750 |
| Methyl methacrylate | 750 |
| Butyl acrylate | 2000 |
| 2-Hydroxyethyl acrylate | 1500 |
| Total | 5000 |
| Initiator Solution | |
| Methyl n-amyl ketone | 333 |
| t-Butyl peracetate (75% solids in mineral spirits) | 167 |
| Total | 500 |

The flask charge was heated to reflux. Addition of the monomer mixture and initiator solution was then started simultaneously. The monomer mixture was added linearly over 225 minutes and the initiator solution was added linearly over 240 minutes. The reaction mixture was maintained at reflux during the addition period and for an additional 30 minutes after addition of the initiator solution was complete. About 1762 grams of volatiles, consisting principally or methyl n-amyl ketone, was then distilled off and the solution in the flask was cooled. The resulting polymer solution had a solids content of about 75%.

The polymer was a styrene/methyl methacrylate/butyl acrylate/2-hydroxyethyl acrylate copolymer in a weight ratio of 15/15/40/30. The polymer had a $\overline{M}w$ of about 6,000 and a calculated Tg of −9° C.

The following aluminum flake mill base was prepared:

| | Grams |
|---|---|
| Portion 1 | |
| Acrylic polymer solution (prepared above) | 2780 |
| Ultraviolet light absorber solution of a substituted benzotriazole (Tinuvin ® 328) in xylene (30% solids) | 632 |
| Hindered amine light stabilizer (Tinuvin ® 079) solution in xylene (40% solids) | 237 |
| Portion 2 | |
| Non-leafing, acid spot resistant, medium particle size aluminum flake paste (64% solids in mineral spirits) | 1851 |

Portion 1 was charged to a mixing vessel and thoroughly blended. Portion 2 was added, and the mixture was stirred vigorously to form a homogeneous dispersion of the aluminum flakes. The mill base contained 21.54% of pigment, 37.9% of acrylic polymer, 3.45% of ultraviolet light absorber, and 1.72% of hindered amine light absorber.

The following dark blue metallic color coat enamel was prepared:

| | Grams |
|---|---|
| Portion 1 | |
| Blue mill base consisting of 12.0% of copper phthalocyanine blue pigment (green shade), 48.0% of the acrylic polymer prepared above and 40.0% of methyl n-amyl ketone and prepared by grinding in a Schold mill | 2846.4 |
| Black mill base (described under Portion 1 of Example 1 color coat compositions | 373.8 |
| White mill base consisting of 70.0% of rutile titanium dioxide pigment, 10.0% of the acrylic polymer prepared above, and 20.0% of methyl n-amyl ketone and prepared by sand grinding | 37.2 |
| Aluminum flake mill base (prepared above) | 179.7 |
| Acrylic polymer solution (prepared above) | 246.3 |
| Ultraviolet light absorber solution of a substituted benzotriazole (Tinuvin ® 328) in xylene (30% solids) | 179.1 |
| Hindered amine light stabilizer (Tinuvin ® 079) solution in xylene (40% solids) | 67.5 |
| Portion 2 | |
| Methoxy/butoxymethyl melamine (Resimene ® 755) | 1140.0 |
| ASB solution (described under Portion 3 of Example 1 color coat compositions) | 500.0 |
| Toluene denatured anhydrous ethyl alcohol | 550.2 |
| Portion 3 | |
| Amine solution consisting of 25.64% of Amine CS-1135 ® 4,4-dimethyloxazolidine solution in water (78% active) and 74.36% of methanol | 44.7 |
| Catalyst solution consisting of 17.8% of p-toluenesulfonic acid, 12.5% of Amine | 60.6 |

-continued

| | Grams |
|---|---|
| CS-1135 ®, and 69.7% of methanol | |
| Methanol | 198.0 |
| Portion 4 | |
| Thinner consisting of 25% of toluene-denatured anhydrous ethyl alcohol, 25% of propylene glycol monomethyl ether, and 50% of xylene | 940.0 |

Portion 1 was charged to a mixing vessel and thoroughly blended. Portion 2 was added and stirred in for 15 minutes. Portion 3 was then added and stirred in for 30 minutes. The color coat enamel was reduced to a spray viscosity of 35 seconds in a No. 2 Fisher cup with Portion 5 and filtered through a fine paint strainer. The resulting color coat enamel had an acrylic polymer/melamine formaldehyde resin/ASB/p-toluenesulfonic acid/ultraviolet light absorber/hindered amine light stabilizer binder ratio of 55.15/36.76/4.84/0.35/1.93/0.97, a pigment/binder ratio of 14.5/100 and a calculated solids content at 48.2%.

The following high solids clear coat enamel was prepared:

| | Grams |
|---|---|
| Portion 1 | |
| Acrylic polymer solution (prepared above) | 3200.0 |
| Silica mill base (described in Portion 2 of Example 1 clear coat composition) | 896.0 |
| Methoxy/butoxymethyl melamine (Resimene ® 755) | 1155.5 |
| Portion 2 | |
| Ultraviolet light absorber solution of a substituted benzotriazole (Tinuvin ® 328) in xylene (30% solids) | 400.0 |
| Hindered amine light stabilizer (Tinuvin ® 079) solution in xylene (40% solids) | 100.0 |
| Silicone solution (1% solids in xylene of 100 centistoke silicone fluid) | 60.0 |
| Portion 3 | |
| Amine solution (described in Portion 4 of above color coat composition) | 62.8 |
| Catalyst solution (described in Portion 4 of above color coat composition) | 80.8 |
| Methanol | 198.9 |
| Portion 4 | |
| Polyvinyl pyrrolidone solution (described in Portion 4 of Example 1 clear coat composition) | 20.0 |
| Portion 5 | |
| Xylene | 703.8 |

Portion 1 was charged to a mixing vessel and thoroughly blended. Portions 2 and 3 were added in turn and stirred in until homogeneous. Portion 4 was then added and stirred in for 30 minutes. The clear coat enamel was reduced to a spray viscosity of 45 seconds in a No. 2 Fisher cup with Portion 5 and filtered through a milk filter.

The resulting clear coat enamel had an acrylic/polymer/melamine formaldehyde resin/p-toluenesulfonic acid/ultraviolet light absorber/hindered amine light stabilizer binder ratio of 57.49/38.33/0.35/2.87/0.96, a silica/binder ratio of 1.9/100 and a calculated solids content of 61.9%.

The above color coat enamel and the above clear coat enamel were sprayed consecutively onto a 20 gauge phosphatized steel panel primed with an alkyd resin type dip primer. The application, solvent flashing and baking conditions were similar to those in Example 1. The resulting dark blue metallic color coat/clear coat finish was free of mottling and had an attractive, uniform appearance. The coating had a color coat thickness of 0.8 mil, a clear coat thickness of 1.5 mils, a gloss measured at 20° of 89 and a distinctness of image of 78.

EXAMPLE 3

An acrylic polymer solution was prepared as follows:

| | | Grams |
|---|---|---|
| Portion 1 | | |
| Ethylene glycol monoethyl ether acetate | | 1180 |
| n-Butyl alcohol | | 230 |
| Aromatic hydrocarbon solvent boiling at 150–190° C. (Aromatic 100) | | 1920 |
| | Total | 3330 |
| Monomer Mixture | | |
| Methyl methacrylate | | 2150 |
| Butyl acrylate | | 2050 |
| 2-Hydroxyethyl acrylate | | 850 |
| Acrylic acid | | 210 |
| | Total | 5260 |
| Initiator | | |
| Di-tert-butyl peroxide | | 157 |

Portion 1 was charged into a 12 liter round bottom flask equipped with a thermometer, stirrer, reflux condenser, two addition funnels, and a heating mantle. The monomer mixture was premixed and charged to one of the addition funnels and the initiator was charged to the other addition funnel. The flask charge was heated to reflux. Addition of the monomer mixture and the initiator was then started simultaneously, and both were added continuously and linearly over a period of 4 hours. The reaction mixture was maintained at reflux during the addition period and then for an additional 4 hours. The resulting polymer solution was cooled. It had a solids content of about 61%.

The polymer was a methyl methacrylate/butyl acrylate/2-hydroxyethyl acrylate/acrylic acid copolymer in a weight ratio of 41/39/16/4. The polymer had a $\overline{M}w$ of about 18,000 and a calculated Tg of 5° C.

A composite mill base was prepared by charg- a one-half gallon steel mill containing 925 cc of diagonal steel media with the following ingredients:

| | Grams |
|---|---|
| Acrylic polymer solution (prepared above) | 507.3 |
| Nickel octoate solution in xylene (66% solids) | 5.5 |
| Xylene | 235.6 |
| n-Butyl acetate | 58.9 |
| Rutile titanium dioxide pigment | 17.3 |
| High color furnace type carbon black pigment | 13.8 |
| Quinacridone pigment (Monastral ® Violet RT-887-D) | 56.8 |
| Total | 895.2 |

The mill was placed on rolls to grind for 64 hours. The resulting mill base was fluid and contained well dispersed pigments. It was filtered off from the grinding media. The mill base had a solids content of 44.8% and contained 9.8% of pigments.

The following light blue metallic color coat enamel was prepared:

| | Grams |
|---|---|
| Portion 1 | |
| Acrylic polymer solution (prepared above) | 1268.4 |
| Ultraviolet light absorber solution of a substituted benzotriazole (Tinuvin ® 328) in xylene (30% solids) | 93.5 |
| Bis-(1,2,2,6,6-pentamethyl-4-piperidinyl) decanedioate hindered amine light stabilizer (Tinuvin ® 292) | 28.0 |
| Toluene | 148.4 |
| Silicone solution of an organofunctional silicone (Baysilone ® Fluid OL) in xylene (10% solids) | 1.4 |
| Portion 2 | |
| Blue mill base consisting of 18.0% of copper phthalocyanine blue pigment, 40.0% of the acrylic polymer solution prepared above, 2.0% of a solution (55% solids in toluene) of the A-B dispersant described under Portion 1 of Example 1, 30.0% of methyl n-amyl ketone, and 10.0% of xylene and prepared by grinding in a steel mill with diagonal steel media | 335.5 |
| Composite mill base (prepared above) | 340.5 |
| Portion 3 | |
| Polyurethane solution described under Portion 1 of Example 1 | 662.0 |
| Portion 4 | |
| Bright, non-leafing, acid spot resistant, medium particle size aluminum flake paste (65.5% solids in mineral spirits) | 370.0 |
| Di-isobutyl ketone | 146.8 |
| Portion 5 | |
| ASB solution consisting of 30% of alcohol soluble cellulose acetate butyrate (Eastman CAB-553-0.4) having a viscosity of 0.25 second, 35% of toluene-denatured absolute ethyl alcohol, and 35% of methyl ethyl ketone | 1399.0 |
| High solids, polymeric, methylated melamine-formaldehyde resin, 85% solids in n-butanol (Resimene ® 717) | 1100.9 |
| Methanol | 249.5 |
| Methyl ethyl ketone | 256.1 |
| Portion 6 | |
| Thinner consisting of 50% of methyl ethyl ketone, 25% of ethylene glycol monoethyl ether, and 25% of ethylene glycol monobutyl ether acetate | 3890 |

Portion 1 was charged to a mixing vessel and thoroughly blended. Portions 2 and 3 were added in turn and each stirred in for 10 minutes. Portion 4 was then added and stirred in vigorously for 1 hour to disperse the aluminum flakes. Portion 5 was added and stirred in for 1 hour. The color coat enamel was reduced to a spray viscosity of 22 seconds in a No. 2 Fisher cup with Portion 6 and filtered through a fine paint strainer. The resulting color coat enamel had an acrylic polymer/polyurethane/melamine formaldehyde resin/ASB/ultraviolet light absorber/hindered amine light stabilizer binder ratio of 35/15/33/15/1/1, a pigment/binder ratio of 12/100 and a calculated solids content of 30.5%.

The following clear coat enamel was prepared:

| | Grams |
|---|---|
| Portion 1 | |
| Substituted benzotriazole ultraviolet light absorber (Tinuvin ® 328) | 61.3 |
| Hindered amine light stabilizer (Tinuvin ® 144) | 20.6 |
| Aromatic hydrocarbon solvent boiling at 150–190° C. (Aromatic 100) | 253.2 |
| Acrylic polymer solution of a styrene/methyl methacrylate/butyl acrylate/2-hydroxyethyl acrylate/acrylic acid (15/28/30/25/2 weight ratio)copolymer having a Mw of about 20,000 (65% solids in methyl n-amyl ketone) | 1969.6 |
| Portion 2 | |
| Polymeric, butylated melamine-formaldehyde resin, 58% solids in 32/12 n-butanol/xylene (Luwipal ® 012/58) | 721.1 |
| Polymeric, methylated melamine-formaldehyde resin, 80% solids in isobutanol (Cymel ® 325) | 540.8 |
| Silicone solution (1% solids in xylene of 100 centistoke silicone fluid) | 8.6 |
| Methanol | 18.0 |
| Portion 3 | |
| Aromatic hydrocarbon solvent boiling at 150–190° C. (Aromatic 100) | 1750 |

Portion 1 was charged to a mixing vessel and thoroughly blended. Portion 2 was added and stirred in for 30 minutes. The clear coat enamel was reduced to a spray viscosity of 35 seconds in a No. 2 Fisher cup with Portion 3 and filtered through a milk filter. The resulting clear coat enamel had an acrylic polymer/butylated melamine formaldehyde resin/methylated melamine formaldehyde resin/ultraviolet light absorber/hindered amine light stabilizer binder ratio of 58.1/18.8/19.4/2.8/0.9 and a calculated solids content of 41.7%.

The above color coat enamel and the above clear coat enamel were sprayed consecutively onto 20 gauge phosphatized steel panels primed as in Example 1. The application, solvent flashing and baking conditions were the same as in Example 1, except that the reciprocating arm carrying the spray guns was run at 1400 inches/minute, the solvent flash period between the color coat and the clear coat was 3 minutes, and the gun-to-panel distance and atomizing air pressure were varied as follows in order to determine the appearance uniformity of the finish under an extreme range of application conditions:

9" Panel—The color coat was applied at a gun-to-panel distance of 9 inches using an atomizing air pressure of 55 psi in order to give a coarse spray and a wet, thick color coat film.

12" Panel—The color coat was applied at a gun-to-panel distance of 12 inches using an atomizing air pressure of 65 psi, representing average application conditions.

15" Panel—The color coat was applied at a gun-to-panel distance of 15 inches using an atomizing air pressure of 75 psi in order to give a fine spray and a dry, thin color coat film.

The clear coat was applied in an identical manner to all three panels using a gun-to-panel distance of 12 inches and an atomizing air pressure of 65 psi, representing average application conditions.

The properties of the three color coat/clear coat panels were as follows:

| Property | 9" Panel | 12" Panel | 15" Panel |
|---|---|---|---|
| Thickness, mils: | | | |
| Color coat | 1.0 | 0.8 | 0.5 |
| Clear coat | 1.7 | 1.7 | 1.7 |
| Gloss measured at 20° | 94 | 94 | 94 |
| Distinctness of image | 91 | 86 | 88 |

-continued

| Property | 9″ Panel | 12″ Panel | 15″ Panel |
|---|---|---|---|
| Head-on brightness | 84 | 85 | 84 |
| Metallic index | 61 | 61 | 61 |
| Mottling | None | None | None |

This light blue metallic color coat/clear coat finish showed a uniform metallic appearance and freedom from mottling when applied under an extreme range of application conditions. It, therefore, had excellent application latitude.

EXAMPLE 4

The following white color coat enamel was prepared:

|  | Grams |
|---|---|
| Portion 1 | |
| Xylene | 138.4 |
| Substituted benzotriazole ultraviolet light absorber (Tinuvin ® 328) | 13.3 |
| Bis-(1,2,2,6,6-pentamethyl-4-piperidinyl) decanedioate hindered amine light stabilizer (Tinuvin ® 292) | 13.3 |
| Silicone solution of an organofunctional silicone (Baysilone ® Fluid OL) in xylene (10% solids) | 1.0 |
| Acrylic polymer solution (prepared in Example 3) | 91.0 |
| Portion 2 | |
| ASB solution (described under Portion 3 of Example 1 color coat) | 217.7 |
| Polyurethane solution (described under Portion 1 of Example 1 color coat) | 833.6 |
| High solids, polymeric, methylated melamine-formaldehyde resin, 85% solids in n-butanol (Resimene ® 717) | 515.7 |
| Methyl n-amyl ketone | 423.7 |
| Methanol | 160.7 |
| Denatured anhydrous ethyl alcohol | 211.2 |
| Portion 3 | |
| White mill base described under Portion 1 of Example 2 | 2054.8 |
| Portion 4 | |
| Catalyst solution consisting of 42% of phenyl acid phosphate and 58% of n-butanol | 17.9 |
| Ethylene glycol monoethyl ether acetate | 252.2 |
| Methyl isobutyl ketone | 54.3 |
| Portion 5 | |
| Ethylene glycol monoethyl ether acetate | 380 |

Portion 1 was charged to a mixing vessel and thoroughly blended. Portions 2, 3, and 4 were added in turn and each stirred in for 30 minutes. The color coat enamel was reduced to a spray viscosity of 32 seconds in a No. 2 Fisher cup and filtered through a fine paint strainer. The resulting color coat enamel had a low molecular weight acrylic polymer/higher molecular weight acrylic polymer/polyurethane/melamine formaldehyde resin/ASB/phenyl acid phosphate/ultraviolet light absorber/hindered amine light stabilizer binder ratio of 19.7/40.0/32.7/5.0/0.6/1.0/1.0, a pigment-/binder ratio of 109/100 and a calculated solids content of 51.3%.

The above color coat enamel and the clear coat enamel prepared in Example 3 were sprayed consecutively onto a 20 gauge phosphatized steel panel primed as in Example 1. The application, solvent flashing and baking conditions were similar to those in Example 1. The resulting white color coat/clear coat finish had a color coat thickness of about 1.4 mils, a clear coat thickness of about 1.8 mils, a gloss measured at 20° of about 95, a distinctness of image of about 90 and a Tukon hardness of about 5 Knoop. It had a uniform color free of any clear coat strike-in effects.

I claim:

1. An acrylic color coat enamel coating composition comprising about 25–50% by weight of a binder of film-forming constituents and correspondingly about 50–75% by weight of a volatile organic solvent carrier at spray viscosity and containing in addition about 2–150% by weight, based on the weight of the binder, of pigment; wherein the binder of film-forming constituents consists essentially of about 20–70% by weight, based on the weight of the binder, of an acrylic polymer consisting essentially of 50–90% by weight of an alkyl methacrylate or an alkyl acrylate each having 1–12 carbon atoms in the alkyl groups or a mixture thereof and 10–50% by weight of a hydroxyalkyl acrylate or a hydroxyalkyl methacrylate each having 2–4 carbon atoms in the hydroxyalkyl groups or a mixture thereof and in which the acrylic polymer has a weight average molecular weight of about 2500–25,000 and a glass transition temperature of about $-20°$ C. to $+25°$ C.; about 0–40% by weight, based on the weight of the binder, of a hydroxy-terminated polyester urethane resin; about 25–40% by weight, based on the weight of the binder, of an alkylated melamine formaldehyde crosslinking agent; and about 4–20% by weight, based on the weight of the binder, of a rheology control agent consisting essentially of an alcohol soluble cellulose acetate butyrate having a butyryl content of about 45–50% by weight, a hydroxy content of about 4–5% by weight and a viscosity of about 0.2–0.4 second.

2. The coating composition of claim 1 wherein the acrylic polymer contains in addition about 0.1–5% by weight, based on the weight of the acrylic polymer, of an ethylenically unsaturated carboxylic acid.

3. The coating composition of claim 1 wherein the crosslinking agent is a fully alkylated melamine formaldehyde resin having 1–4 carbon atoms in the alkyl groups.

4. The coating composition of claim 3 wherein the crosslinking agent is a fully alkylated methoxy/butoxymethyl melamine.

5. The coating composition of claim 1 wherein the crosslinking agent is a partially alkylated, polymeric melamine formaldehyde resin having 1–4 carbon atoms in the alkyl groups.

6. The coating composition of claim 1 wherein the volatile organic solvent carrier consists essentially of about 30–60% by weight, based on the weight of the total solvent, of methanol, ethanol, acetone, methyl ethyl ketone or a mixture thereof and about 40–70% by weight, based on the weight of the total solvent, of methyl n-amyl ketone, n-butyl acetate, ethylene glycol monobutyl ether acetate, an approximately equivolume blend of ethylene glycol monoethyl ether acetate with diisobutyl ketone or a mixture thereof.

7. The coating composition of claim 6 wherein the volatile organic solvent carrier contains in addition 10–20% by weight, based on the weight of the total solvent, of ethylene glycol monomethyl ether, ethylene glycol monoethyl ether, propylene glycol monomethyl ether or a mixture thereof.

8. The coating composition of claim 1 containing 0.1–2% by weight, based on the weight of the binder, of an acid catalyst.

9. The coating composition of claim 3 containing 0.1–2% by weight, based on the weight of the binder, of an alkyl sulfonic acid or an aryl sulfonic acid catalyst each fully neutralized with an amine.

10. The coating composition of claim 9 in which the amine is n-propylamine or 4,4-dimethyloxazolidine.

11. The coating composition of claim 5 containing 0.1–2% by weight, based on the weight of the binder, of phosphoric acid, an alkyl acid phosphate or an aryl acid phosphate.

12. The coating composition of claim 1 containing about 0.1–4% by weight, based on the weight of the binder, of an ultraviolet light absorber.

13. The coating composition of claim 1 containing about 0.1–2% by weight, based on the weight of the binder, of a hindered amine light stabilizer.

14. The coating composition of claim 1 containing aluminum flake pigment.

15. A substrate having a cured finish comprising the color coat coating composition of claim 1 firmly adhered thereto and a clear coat firmly adhered to the color coat coating composition of claim 1.

16. An acrylic color coat enamel coating composition comprising about 28–45% by weight of a binder of film-forming constituents and correspondingly about 55–72% by weight of a volatile organic solvent carrier at spray viscosity and containing in addition about 2–150% by weight, based on the weight of the binder, of pigment wherein the binder of film-forming constituents consists essentially of about 20–65% by weight, based on the weight of the binder, of an acrylic polymer consisting essentially of 50–90% by weight of an alkyl methacrylate or an alkyl acrylate each having 1–12 carbon atoms in the alkyl groups or a mixture thereof and 10–50% by weight of a hydroxyalkyl acrylate or a hydroxyalkyl methacrylate each having 2–4 carbon atoms in the hydroxyalkyl groups or a mixture thereof and in which the acrylic polymer has a weight average molecular weight of about 2500–25,000 and a glass transition temperature of about $-20°$ C. to $+25°$ C.; about 0–40% by weight, based on the weight of the binder, of a hydroxy-terminated polyester urethane resin; about 30–40% by weight, based on the weight of the binder, of an alkylated melamine formaldehyde crosslinking agent; and about 4–20% by weight, based on the weight of the binder of a rheology control agent consisting essentially of an alcohol soluble cellulose acetate butyrate having a butyryl content of about 45–50% by weight, a hydroxyl content of about 4–5% by weight and a viscosity of about 0.2–0.4 second.

17. An acrylic color coat enamel coating composition comprising about 33–45% by weight of a binder of film-forming constituents and correspondingly about 55–67% by weight of a volatile organic solvent carrier at spray viscosity and containing in addition about 2–150% by weight, based on the weight of the binder, of pigment wherein the binder of film-forming constituents consists essentially of about A. 20–66% by weight, based on the weight of the binder, of an acrylic polymer consisting essentially of
  (1) about 40–80% by weight, based on the weight of the acrylic polymer, of an alkyl methacrylate or an alkyl acrylate each having 1–6 carbon atoms in the alkyl groups or a mixture thereof,
  (2) about 20–40% by weight, based on the weight of the acrylic polymer, of a hydroxyalkyl acrylate or a hydroxyalkyl methacrylate each having 2–4 carbon atoms in the hydroxyalkyl groups or a mixture thereof,
  (3) 0–20% by weight, based on the weight of the acrylic polymer, of styrene; and
  wherein the acrylic polymer has a weight average molecular weight of about 3000–12,000 and a glass transition temperature of about $-20°$ C. to $+25°$ C.;
B. 0–20% by weight, based on the weight of the binder, of a hydroxy-terminated polyester urethane resin having a number average molecular weight of about 4000–10,000;
C. 30–40% by weight, based on the weight of the binder, of a fully alkylated melamine formaldehyde crosslinking agent having 1–4 carbon atoms in the alkyl groups;
D. 4–20% by weight, based on the weight of the binder, of an alcohol soluble cellulose acetate butyrate rheology control agent having a butyryl content of about 45–50% by weight, a hydroxyl content of about 4–5% by weight and a viscosity of about 0.2–0.4 second;
E. 0.3–10% by weight, based on the weight of the binder, of an alkyl sulfonic acid or an aryl sulfonic acid catalyst each fully neutralized with n-propylamine or 4,4-dimethyloxazolidine;
F. 0–3% by weight, based on the weight of the binder, of an ultraviolet light absorber; and
G. 0–2% by weight, based on the weight of the binder, of a hindered amine light stabilizer.

18. An acrylic color coat enamel coating composition comprising about 28–40% by weight of a binder of film-forming constituents and correspondingly about 60–72% by weight of a volatile organic solvent carrier at spray viscosity and containing in addition about 2–150% by weight, based on the weight of the binder, of pigment wherein the binder of film-forming constituents consists essentially of about A. 20–58% by weight, based on the weight of the binder, of an acrylic polymer consisting essentially of
  (1) about 50–88%, based on the weight of the acrylic polymer, of an alkyl methacrylate or an alkyl acrylate each having 1–6 carbon atoms in the alkyl groups or a mixture thereof,
  (2) about 10–25% by weight, based on the weight of the acrylic polymer, of a hydroxyalkyl acrylate or a hydroxyalkyl methacrylate each having 2–4 carbon atoms in the hydroxyalkyl groups or a mixture thereof,
  (3) about 2–5% by weight, based on the weight of the acrylic polymer, of acrylic acid or methacrylic acid,
  (4) 0–20% by weight, based on the weight of the acrylic polymer, of styrene; and
  wherein the acrylic polymer has a weight average molecular weight of about 10,000–25,000 and a glass transition temperature of about $-20°$ C. to $+25°$ C.;
B. 10–40% by weight, based on the weight of the binder, of a hydroxy-terminated polyester urethane resin having a number average molecular weight of about 4000–10,000;
C. 28–38% by weight, based on the weight of the binder, of a partially alkylated, polymeric melamine formaldehyde resin having 1–4 carbon atoms in the alkyl groups;

D. 4–20% by weight, based on the weight of the binder, of an alcohol soluble cellulose acetate butyrate rheology control agent having a butyryl content of about 45–50% by weight, a hydroxyl content of about 4–5% by weight and a viscosity of about 0.2–0.4 second;

E. 0–2% by weight, based on the weight of the binder, of a catalyst comprising phosphoric acid, an alkyl acid phosphate or an aryl acid phosphate;

F. 0–3% by weight, based on the weight of the binder, of an ultraviolet light absorber; and G. 0–2% by weight, based on the weight of the binder, of a hindered amine light stabilizer.

19. The coating composition of claim 18 in which the acrylic polymer consists essentially of 25–55% by weight of methyl methacrylate, 30–50% by weight of butyl acrylate, 12–20% by weight of 2-hydroxyethyl acrylate and 3–5% by weight of acrylic acid and in which the acrylic polymer has a weight average molecular weight of about 15,000–20,000 and a glass transition temperature of about $-15°$ C. to $+25°$ C.

* * * * *